United States Patent [19]

Murase et al.

[11] Patent Number: 5,765,443

[45] Date of Patent: Jun. 16, 1998

[54] JOINT MECHANISM AND ROBOT HAVING THE JOINT MECHANISM

[76] Inventors: Yuichi Murase; Hiroki Kobayashi, both of c/o Fujitsu Limited, 1-1, Kamikodanaka 4-chome, Nakahara-ku, Kawasaki-shi, Kanagawa 211, Japan

[21] Appl. No.: 789,642

[22] Filed: Jan. 27, 1997

[30] Foreign Application Priority Data

Jul. 24, 1996 [JP] Japan .................................. 8-195033
Oct. 18, 1996 [JP] Japan .................................. 8-276534

[51] Int. Cl.⁶ .............................. B25J 17/00; F16H 21/40
[52] U.S. Cl. .............................. 74/490.05; 74/96; 901/28
[58] Field of Search .................... 74/96, 490.05, 74/490.06; 901/28, 29

[56] References Cited

U.S. PATENT DOCUMENTS

| | | | |
|---|---|---|---|
| 2,490,624 | 12/1949 | Forwald | 74/96 |
| 4,723,460 | 2/1988 | Rosheim | 901/28 X |
| 4,805,477 | 2/1989 | Akeel | 74/490.05 |

FOREIGN PATENT DOCUMENTS

| | | | |
|---|---|---|---|
| 630559 | 5/1936 | Germany | 74/96 |
| 2-24086 | 1/1990 | Japan | 901/28 |

*Primary Examiner*—Allan D. Herrmann
*Attorney, Agent, or Firm*—Fujitsu Limited

[57] ABSTRACT

A robot having a joint mechanism including a first arm member; a second arm member supported to the first arm member so as to be rotatable about a first axis; a swinging member supported to the second arm member so as to be rotatable about a second axis intersecting the first axis at a bending point, the swinging member having a first connecting portion at a position spaced from the second axis; a power transmitting member supported to the first arm member so as to be rotatable about a third axis orthogonally intersecting the first axis at the bending point, the power transmitting member having a second connecting portion at a position spaced from the third axis, the power transmitting member being connected at the second connecting portion to the first connecting portion of the swinging member so as to be rotatable about a fourth axis intersecting the second axis at the bending point and obliquely intersecting the third axis at the bending point; and a driving motor mounted on the first arm member, for rotationally driving the power transmitting member about the third axis.

13 Claims, 13 Drawing Sheets

5,765,443

JOINT MECHANISM AND ROBOT HAVING THE JOINT MECHANISM

BACKGROUND OF THE INVENTION

1. Field of the Invention

The present invention relates to a joint mechanism (shaft tilting mechanism) used in a joint portion of a robot.

2. Description of the Related Art

FIGS. 14A and 14B illustrate different types of joint mechanisms of robots in the related art. In FIG. 14A, there is shown a joint mechanism 11 having links $12_1$ and $12_2$ and a link shaft 13 rotatably connected to the links $12_1$ and $12_2$. A motor 14 for swinging the link $12_1$ in a direction shown by an arrow A is mounted to the link shaft 13 through a gear (reduction gear) 15 meshing with a given number of gears. A motor 16 is mounted to the link $12_2$ to rotate the link $12_2$ in a direction shown by an arrow B. The motors 14 and 16 are controlled by a controller 17. The controller 17 is connected to the motors 14 and 16 through wiring including cords 18a and 18b. In the joint mechanism 11, positioning of the link $12_1$, for example, as an output arm is performed by driving the motor 16 to rotate the link $12_2$ by an angle α and then driving the motor 14 to swing the link $12_1$ by an angle θ under the control of the controller 17.

In FIG. 14B, there is shown a joint mechanism 21 using a so-called universal joint, which is described in Japanese Patent Laid-open No. 60-260720, for example. The joint mechanism 21 is composed of a universal joint 22 and motors 23 and 24. Rotating shafts 25 and 26 are mounted on output shafts of the motors 23 and 24, respectively, and slide plates 27 and 28 are mounted on the front ends of the rotating shafts 25 and 26, respectively. The slide plates 27 and 28 are slidably engaged with each other through bearings or the like, and are tilted with respect to the rotating shafts 25 and 26. Assuming that the motor 24 side is a fixed system and the motor 23 side is a movable system, the motor 23 side can be positioned in a conical space 29 about a shaft intersection O of the universal joint 22 by rotating the motors 23 and 24 to slide the slide plates 27 and 28.

However, the joint mechanism 11 shown in FIG. 14A has a problem such that since the motor 14 is axially mounted on the link shaft 13, the motor 14 and the gear 15 project from the joint portion to cause mechanical interference, and that the swingable range is limited by the limit of twist of the cords 18a and 18b for motor wiring. Further, it is difficult to reduce backlash of the gear 15 and the other gears meshing together, causing a reduction in position accuracy. On the other hand, the joint mechanism 21 shown in FIG. 14B has a problem such that since a degree of freedom of motion allowed by a single motor (either the motor 23 or 24) is not on a plane, the degrees of freedom of motion allowed by the motors 23 and 24 must be mixed to obtain a simple motion on a plane such as a finger motion, thus requiring a complicated control operation.

SUMMARY OF THE INVENTION

It is therefore an object of the present invention to reduce the limitation of operation due to mechanical interference and twist of wiring in association with the bending motion.

It is another object of the present invention to achieve high accuracy with a simple configuration.

In accordance with an aspect of the present invention, there is provided a joint mechanism comprising a first arm member; a second arm member supported to the first arm member so as to be rotatable about a first axis; a swinging member or a pivoting member supported to the second arm member so as to be rotatable about a second axis intersecting the first axis at a bending point, the swinging member having a first connecting portion at a position spaced from the second axis; and a power transmitting member supported to the first arm member so as to be rotatable about a third axis orthogonally intersecting the first axis at the bending point, the power transmitting member having a second connecting portion at a position spaced from the third axis, the power transmitting member being connected at the second connecting portion to the first connecting portion of the swinging member so as to be rotatable about a fourth axis intersecting the second axis at the bending point and obliquely intersecting the third axis at the bending point.

When the power transmitting member is rotationally driven about the third axis by a driving motor, the first arm member and the second arm member relatively produce a bending (swinging) motion about the first axis by the operation of the power transmitting member and the swinging member.

According to the present invention, mechanical interference of the driving motor with the arm or other components in association with the bending motion can be reduced owing to the specific mechanism. Further, twist of wiring such as a power supply line for the driving motor in association with the bending motion can be eliminated. Further, since no gears are used, high positioning accuracy can be realized.

The above and other objects, features and advantages of the present invention and the manner of realizing them will become more apparent, and the invention itself will best be understood from a study of the following description and appended claims with reference to the attached drawings showing some preferred embodiments of the invention.

DETAILED DESCRIPTION OF THE PREFERRED EMBODIMENTS

(First Preferred Embodiment)

Figure 1A:
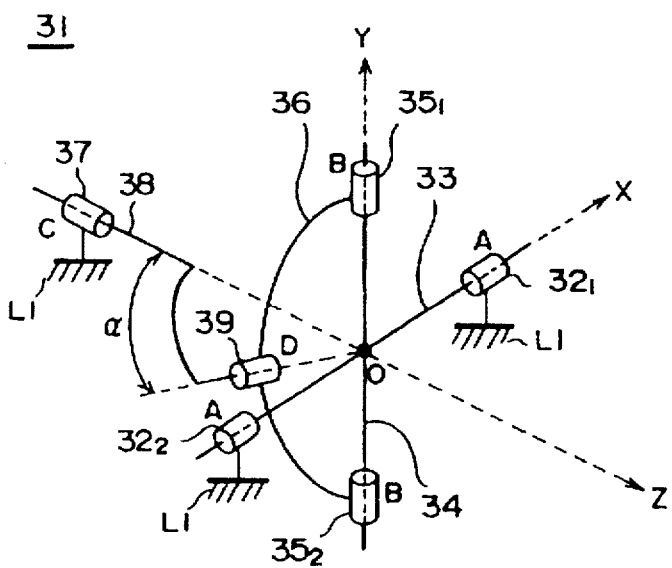
FIGS. 1A and 1B are schematic views showing the configuration and operation of a first preferred embodiment of the present invention.
Figure 1B:
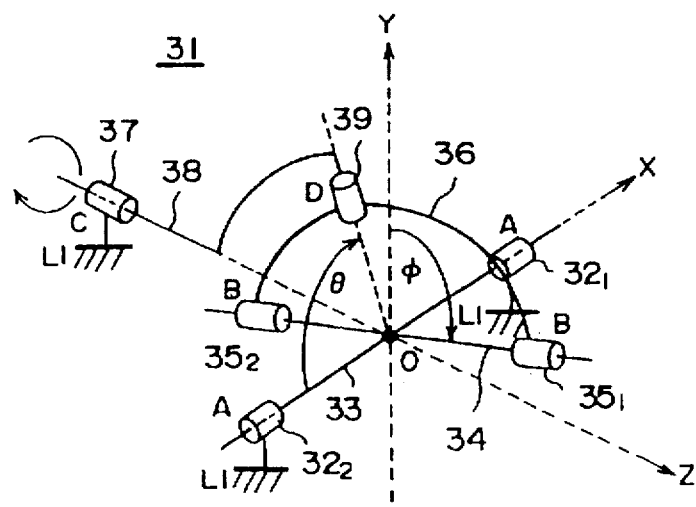

FIGS. 1A and 1B are views showing a first preferred embodiment of the present invention, in which FIG. 1A is a perspective view showing the concept of a joint mechanism 31 according to the present invention, and FIG. 1B is a perspective view showing the operation of the joint mechanism 31. The joint mechanism 31 shown in FIG. 1A is located in a space of a so-called Cartesian coordinate system O-XYZ having an X axis as a first axial system, a Y axis as a second axial system, and a Z axis as a third axial system, all of which intersect each other at an origin O. A fixed shaft 33 rotatable on the X axis is connected to degrees A of freedom $32_1$ and $32_2$ as two first degrees of freedom of rotation, fixed to an inertial system L1 on the X axis. The degrees of freedom herein mean rotary members such as bearings. The fixed shaft 33 extends through the rotary members and is rotatable about the X axis. The degrees A of freedom $32_1$ and $32_2$ and the fixed shaft 33 constitute a first rotary body.

An output shaft 34 located on the Y axis is fixedly connected to the fixed shaft 33 at a given position (a center position in this preferred embodiment). This fixed position is defined as the origin O of the Cartesian coordinate system O-XYZ. Degrees B of freedom $35_1$ and $35_2$ as two second degrees of freedom of rotation are provided at the opposite ends of the output shaft 34. A U-shaped rotor (swinging member) 36 as an input transmitting body is connected to the output shaft 34 at the degrees B of freedom $35_1$ and $35_2$, and is offset from the axis of the output shaft 34. That is, the U-shaped rotor 36 has a curved shape connected to the output shaft 34 in such a manner as to extend through the output shaft 34 and rotatable relative thereto. A degree D of freedom to be hereinafter described is fixed to the U-shaped rotor 36 at a given position. The output shaft 34, the degrees B of freedom $35_1$ and $35_2$, and the U-shaped rotor 36 constitute a second rotary body. A degree C of freedom 37 as a third degree of freedom of rotation is fixed to the inertial system L1 on the Z axis, and an input shaft 38 extends through the degree C of freedom 37 toward the origin O so as to be rotatable about the Z axis. One end of the input shaft 38 is connected to driving means (not shown in FIGS. 1A and 1B; see FIGS. 3A and 3B) for inputting a torque. The input shaft 38 is bent at its intermediate portion, and a degree D of freedom 39 as a fourth degree of freedom of rotation is provided at the other end of the input shaft 38 so as to be directed to the origin O and tilted at a given angle α with respect to the Z axis. That is, the other end of the input shaft 38 rotatably extends through the degree D of freedom 39 directed to the origin O at the tilt angle α with respect to the Z axis. The U-shaped rotor 36 is fixed to the degree D of freedom 39. The degree C of freedom 37, the input shaft 38, and the degree D of freedom 39 constitute a third rotary body.

It is assumed that the output shaft 34 lies on the Y axis, and that the degree D of freedom 39 fixed to the U-shaped rotor 36 is positioned on an X-Z plane. This stage is regarded as an initial state. When a given rotational amount (angle) is input to the input shaft 38 as shown in FIG. 1B, the degree D of freedom 39 is rotated about the Z axis in such a condition as to be directed to the origin O, so that the output shaft 34 (the degrees B of freedom $35_1$ and $35_2$) is rotated about the X axis through the U-shaped rotor 36 rotating about the fixed point (the origin O), thus transmitting the input torque from the input shaft 38 to the output shaft 34. That is, rotation θ of the input shaft 38 about the Z axis is converted into tilt φ of the output shaft 34 about the X axis. At this time, the degrees B of freedom $35_1$ and $35_2$ connected to the U-shaped rotor 36 function to filter a rotational component about the Y axis, of a conical motion of the center axis of rotation of the degree D of freedom 39, thereby allowing rotation of the output shaft 34 about the X axis only. The tilt angle φ of the output shaft 34 increases with an increase in the input rotational angle θ ranging from 0 to π/2. When θ=π/2, the tilt angle φ becomes maximum, and this maximum tilt angle becomes the angle α between the degree D of freedom 39 and the Z axis. With a further increase in the input rotational angle θ ranging from π/2 to π, the tilt angle φ decreases. When θ=π, the output shaft 34 (the degrees B of freedom $35_1$ and $35_2$) comes to coincidence with the Y axis as shown in FIG. 1A (the degree B of freedom $35_1$ comes to an upper position). With a further increase in the input rotational angle θ ranging from π to 3π/2, the output shaft 34 is tilted reversely from the range of θ=0 to θ=π/2, and then returns to the position shown in FIG. 1A in the range of θ=3π/2 to θ=2π.

Figure 2:
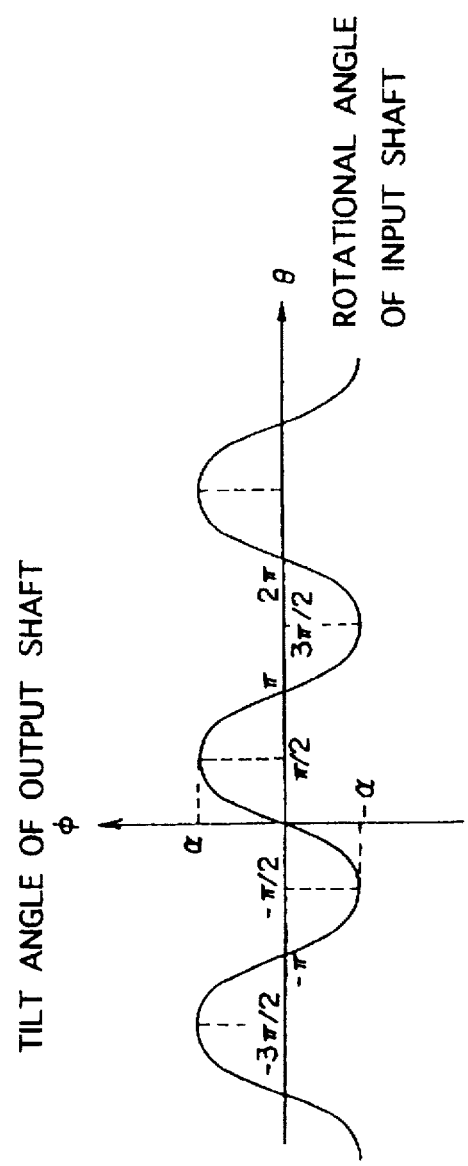
FIG. 2 is a graph showing the relation between the rotational angle of an input shaft and the tilt angle of an output shaft in the first preferred embodiment.

FIG. 2 is a graph showing the relation between the tilt angle φ of the output shaft 34 and the rotational angle θ of the input shaft 38. As shown in FIG. 2, the tilt angle φ of the output shaft 34 changes reciprocatively between −α and +α with a continuous increase in the rotational angle of the input shaft 38. The degree C of freedom 37 and the degrees A of freedom $32_1$ and $32_2$ are degrees of freedom defined with respect to the inertial system L1, so that by replacing the inertial system L1 with a structure as a first connecting member for fixing the outer circumference of a motor for rotating the input shaft 38, a finger mechanism of a robot can be realized.

Figure 3A:
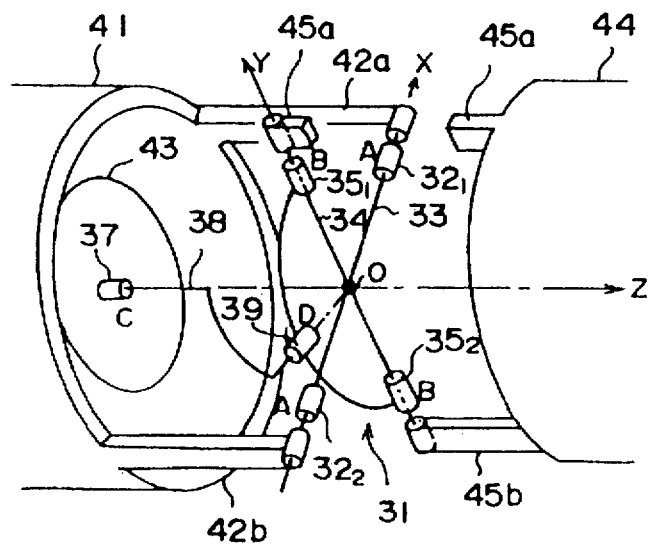
FIGS. 3A and 3B are schematic views illustrating the operation of the joint mechanism shown in FIGS. 1A and 1B in the condition where it is connected to links.
Figure 3B:
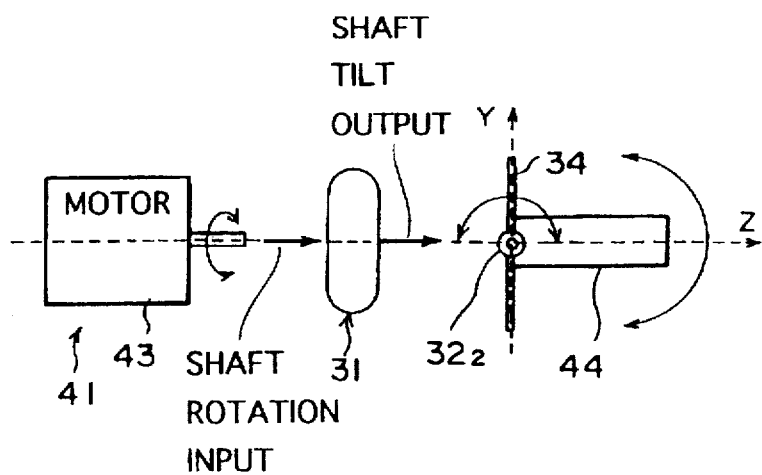

FIGS. 3A and 3B illustrate the operation of the joint mechanism shown in FIGS. 1A and 1B in the condition where it is connected to links. Referring to FIG. 3A, a first link member 41 as a first connecting member is integrally formed with a pair of supporting portions 42a and 42b projecting so as to be opposed to each other, and a motor 43 as driving means (rotational drive source) is provided in the first link member 41. The degrees A of freedom $32_1$ and $32_2$ of the joint mechanism 31 are rigidly connected to the front ends of the supporting portions 42a and 42b of the first link member 41. The degree C of freedom 37 of the joint mechanism 31 is fixed to the motor 43, and the input shaft 38 is mounted on a rotating shaft of the motor 43.

Similarly, a second link member 44 as a second connecting member is integrally formed with a pair of supporting portions 45a and 45b projecting so as to be opposed to each other. The degrees B of freedom $35_1$ and $35_2$ of the joint mechanism 31 are rigidly connected to the front ends of the supporting portions 45a and 45b. Accordingly, the supporting portions 42a and 42b of the first link member 41 are angularly shifted from the supporting portions 45a and 45b of the second link member 44 by a phase difference of π/2 about the Z axis in the O-XYZ coordinate system. That is, the second link member 44 is allowed to produce a rotational motion of one degree of freedom about the X axis relative to the first link member 41. An equivalent operation will be described with reference to FIG. 3B. When the motor 43 is rotated to input a torque to the joint mechanism 31, the output shaft 34 is rotated about the X axis, so that the second link member 44 connected to the output shaft 34 (the degrees B of freedom $35_1$ and $35_2$) is rotated on a Y-Z plane. In this manner, a tilt operation of one degree of freedom on a plane can be controlled by the single motor 43 for inputting single rotation into the joint mechanism 31, thereby facilitating the operation and realizing an improvement in position accuracy.

A tiltable range of the output shaft 34 (the degrees B of freedom $35_1$ and $35_2$) associated with the rotation of the input shaft 38 is determined by the angle of the U-shaped rotor 36 and the angle of the degree D of freedom 39 with respect to the Z axis in the initial state (e.g., in the condition where the first and second link members 41 and 44 shown in FIG. 3A are straight). More specifically, when the angle $\alpha$ of the degree D of freedom 39 in the initial state shown in FIG. 1A is set in the range of $0<\alpha<\pi/2$, the tilt angle $\phi$ of the output shaft 34 changes between $-\alpha$ and $+\alpha$ with a continuous increase in rotational angle $\theta$ of the input shaft 38 from $\theta=0$ to $\theta=2\pi$ as shown in FIG. 2. In the case that the initial state shown in FIG. 3A where the first and second link members 41 and 44 are straight is set in the condition shown in FIG. 1B where the tilt angle $\phi$ of the output shaft 34 (the degrees B of freedom $35_1$ and $35_2$) is maximum, the tilt angle $\phi$ of the output shaft 34 changes between 0 and $2\pi$. That is, this change corresponds to a shift of either $-\alpha$ or $+\alpha$ to 0 in FIG. 2 (in general, such a shift amount can be freely set). Accordingly, the output shaft 34 (the second link member 44) can be reciprocated in a large range from the initial state to only one side (in only one direction), so that application of the joint mechanism to a finger joint or the like allows effective use of a motor torque (which will be hereinafter described).

If the angle $\alpha$ of the degree D of freedom 39 is set to $\pi/4<\alpha\pi/2$ in the initial state from which the output shaft 34 is reciprocated on only one side, the tilt angle $\phi$ of the output shaft 34 does not change between 0 and $2\alpha$ a with an increase in the rotational angle $\theta$ of the input shaft 38 from 0 to $\pi$, but the maximum tilt angle always becomes $\pi/2$. This is due to the fact that there is a singularity such that the degrees B of freedom $35_1$ and $35_2$ come to alignment with the Z axis (the degree C of freedom 37), that is, the output shaft 34 comes to alignment with the degree C of freedom 37. At this singularity, the rotation of the input shaft 38 brings about rotation of the U-shaped rotor 36 about the Z axis only, and has no effect on tilting of the output shaft 34. To avoid the output shaft 34 (the degrees B of freedom $35_1$ and $35_2$) from coming to the singularity (i.e., coming to alignment with the Z axis), the output shaft 34 connecting the degrees B of freedom $35_1$ and $35_2$ is angularly shifted from the initial state shown in FIG. 1A to an initial state where the output shaft 34 obliquely intersects the X axis (i.e., the output shaft 34 is inclined in the X-Y plane). Accordingly, in a set range $0<\alpha<\pi/2$ of the angle $\alpha$ of the degree D of freedom 39, the output shaft 34 can be avoided from coming to alignment with the Z axis and the tilt angle $\phi$ of the output shaft 34 can be reciprocated between $-\alpha$ and $+\alpha$ or between 0 and $2\alpha$ with a continuous increase in the rotational angle $\theta$ of the input shaft from 0 to $2\pi$. That is, even when the tilt angle $\phi$ of the output shaft 34 becomes $\pi/2$, the degrees B of freedom $35_1$ and $35_2$ do not come to alignment with the degree C of freedom 37, so that the maximum tilt angle of the output shaft 34 can be increased.

Figure 4A:
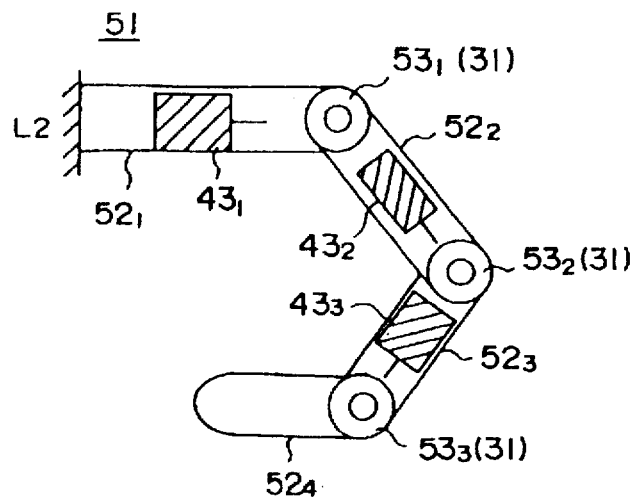
FIGS. 4A and 4B are illustrations of applications of the joint mechanism having one degree of freedom shown in FIGS. 1A and 1B to a finger mechanism and a hand mechanism.
Figure 4B:
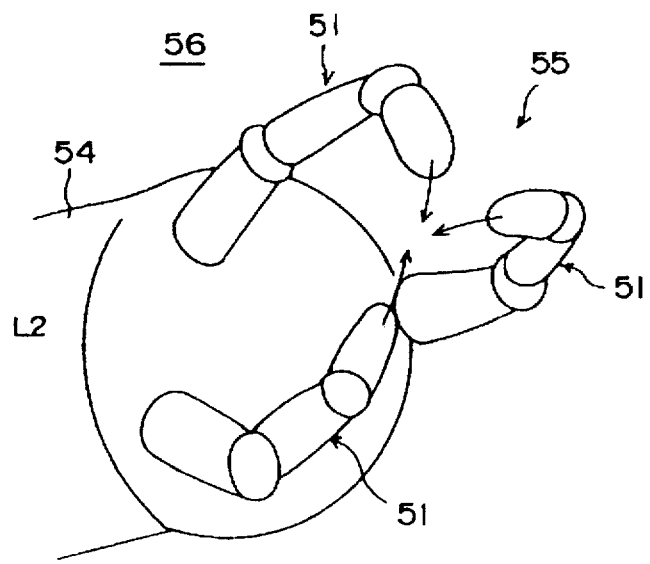

FIGS. 4A and 4B show applications of the joint mechanism having one degree of freedom shown in FIGS. 1A and 1B. In FIG. 4A, there is shown a finger mechanism 51 employing a plurality of joint mechanisms 31 according to the present invention. First to fourth link members $52_1$ to $52_4$ are connected with each other through joint portions $53_1$ to $53_3$, and the first link member $52_1$ is fixed to an inertial system L2. The joint mechanism 31 is used in each of the joint portions $53_1$ to $53_3$. Motors $43_1$ to $43_3$ for respectively rotationally driving the joint portions $53_1$ to $53_3$ are built in the first to third link members $52_1$ to $52_3$, respectively. Accordingly, by driving the motor $43_1$, the output shaft 34 (fixedly connected to the second link member $52_2$) of the joint mechanism 31 in the joint portion $53_1$ is tilted on one side only, thereby allowing one-degree-of-freedom reciprocation of the second link member $52_2$ with respect to the first link member $52_1$. Similarly, the second link member $52_2$ produces one-degree-of-freedom reciprocation of the third link member $52_3$ by driving the motor $43_2$, and the third link member $52_3$ produces one-degree-of-freedom reciprocation of the fourth link member $52_4$ by driving the motor $43_3$. In FIG. 4B, there is shown a robot 56 having a hand mechanism 55 consisting of three finger mechanisms 51 each similar to that shown in FIG. 4A which are connected to the front end of a robot arm 54 as the inertial system L2 with a degree of freedom of centripetal motion. With this arrangement, the motors $43_1$ and $43_2$ are provided in the first and second link members $52_1$ and $52_2$, respectively, and the joint portions $53_1$ and $53_2$ are provided between the first and second link members $52_1$ and $52_2$ and between the second and third link members $52_2$ and $52_3$, respectively. Thus, with a minimum required number of motors, it is possible to realize the hand mechanism 55 having the finger mechanisms 51 with joints having a degree of freedom of centripetal motion and less projection.

(Second Preferred Embodiment)

Figure 5:
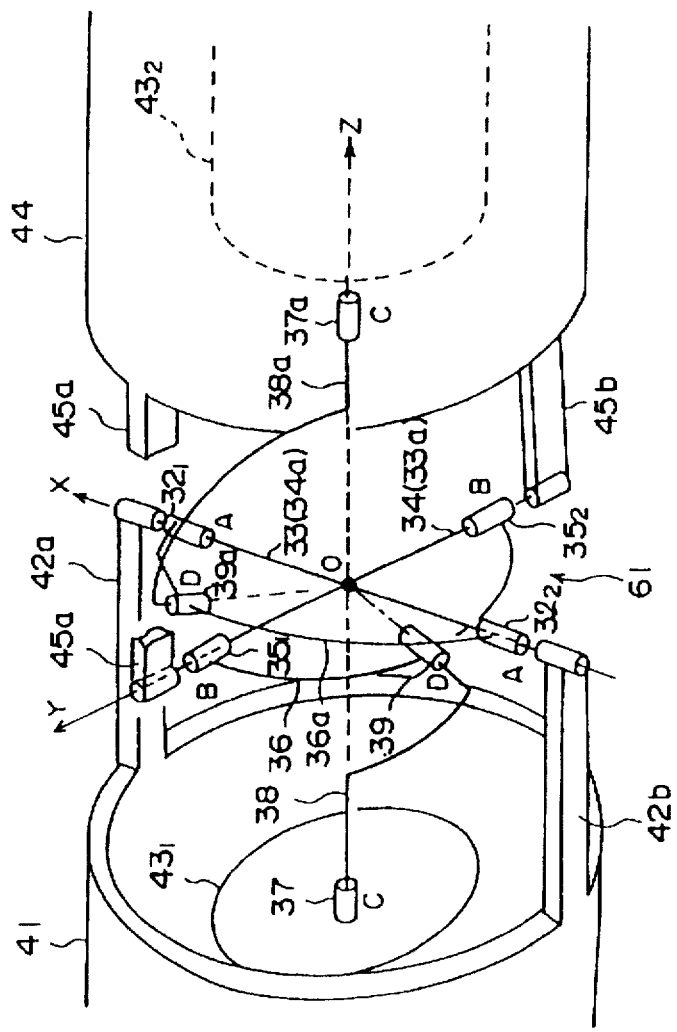
FIG. 5 is a schematic view showing the configuration of a second preferred embodiment of the present invention.

FIG. 5 shows the configuration of a second preferred embodiment of the present invention. In FIG. 5, there is shown a joint mechanism 61 having two degrees of freedom, employing two sets of joint mechanisms 31 mentioned above each as a basic configuration. The joint mechanism 61 will be described on the basis of the components shown in FIG. 3A. As similar to the configuration shown in FIG. 3A, the degrees A of freedom $32_1$ and $32_2$ are rigidly connected to the front ends of two supporting portions 42a and 42b of a first link member 41, and the degrees B of freedom $35_1$ and $35_2$ are rigidly connected to the front ends of two supporting portions 45a and 45b of a second link member 44. Further, a motor $43_1$ is built in the first link member 41, and an input shaft 38 is connected to a rotating shaft of the motor $43_1$ so as to be rotatable through the degree C of freedom 37. The degree D of freedom 39 positioned at a given angle ($\alpha$) with respect to the Z axis aligned with the input shaft 38 is connected to a U-shaped rotor 36 connected between the degrees B of freedom $35_1$ and $35_2$.

Figure 6:
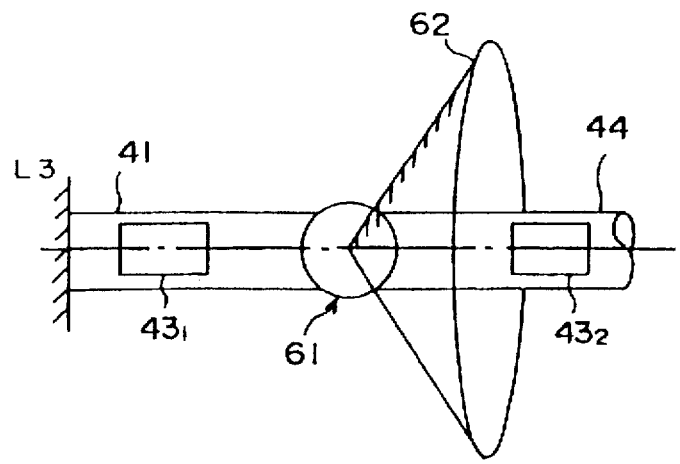
FIG. 6 is a view illustrating a tiltable range of an arm having two degrees of freedom shown in FIG. 5.

On the other hand, a motor $43_2$ is built in the second link member 44, and an input shaft 38a is connected to a rotating shaft of the motor $43_2$ so as to be rotatable through a degree C of freedom 37a aligned with the Z axis. A U-shaped rotor 36a is connected between the degrees A of freedom $32_1$ and $32_2$ so as to be offset from the fixed shaft 33, and a degree D of freedom 39a is connected to the U-shaped rotor 36a at its given position so as to be positioned at a given angle with respect to the Z axis (the same as the angle of the degree D of freedom 39 with respect to the Z axis). Both the degrees D of freedom 39 and 39a are directed to the origin O, and are angularly shifted from each other with a given phase difference, e.g., π/2. That is, the fixed shaft 33 on the X axis for the first link member 41 serves also as an output shaft 34a corresponding to a Y axis for the second link member 44, and the output shaft 34 on the Y axis for the first link member 41 serves also as a fixed shaft 33a corresponding to an X axis for the second link member 44. Accordingly, the joint mechanism 61 can be operated with two degrees of freedom of rotation about the origin O, and a rotational angle of the rotating shaft of each of the motors $43_1$ and $43_2$ can be controlled in a conical movable range with a reduced number of motors, each of operation, and high position accuracy. FIG. 6 illustrates a tiltable region of the joint mechanism 61 having two degrees of freedom shown in FIG. 5. For example, the first link member 41 shown in FIG. 5 is fixed to an inertial system L3, and the second link member 44 is connected through the joint mechanism 61 to the first link member 41. In this condition, the motors $43_1$ and $43_2$ are rotationally driven to thereby control the motion of the second link member 44 in a conical tiltable region 62.

Figure 7:
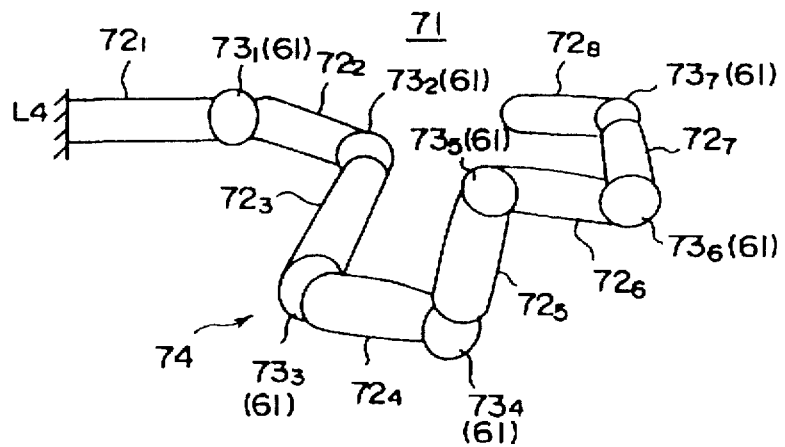
FIG. 7 is a view showing the concept of a robot employing the joint mechanism having two degrees of freedom in the second preferred embodiment.

FIG. 7 shows the concept of a robot employing joint mechanisms each having two degrees of freedom. In FIG. 7, there is shown a robot 71 having an arm mechanism 74. The arm mechanism 74 consists of first to eighth link members $72_1$ to $72_8$ and joint portions $73_1$ to $73_7$ for connecting the link members $72_1$ to $72_8$. The first link member $72_1$ is fixed to an inertial system L4. Each of the joint portions $73_1$ to $73_7$ employs the joint mechanism 61 having two degrees of freedom as mentioned above. Each of the first and eighth link members $72_1$ and $72_8$ includes one motor, and each of the second to seventh link members $72_2$ to $72_7$ includes two motors to effect a two-degree-of-freedom motion, thus realizing the robot 71 having the articulated arm mechanism 74 having multiple degrees of freedom as a whole, with ease of operation and high accuracy.

(Third Preferred Embodiment)

Figure 8:
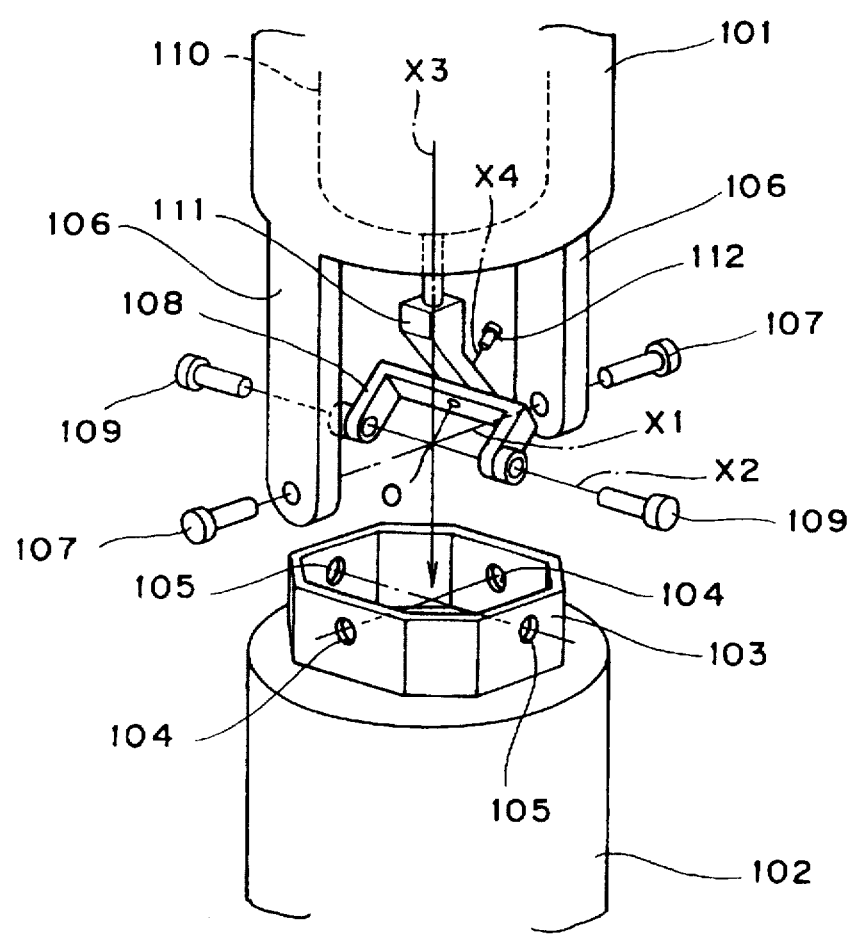
FIG. 8 is a exploded perspective view showing the configuration of a third preferred embodiment of the present invention.

FIG. 8 is an exploded perspective view showing the configuration of an essential part of a third preferred embodiment of the present invention, which is a joint portion of an articulated arm mechanism to be applied to an assembly robot, working robot, etc. In FIG. 8, reference numeral 101 denotes a first arm (link), and reference numeral 102 denotes a second arm (link). The second arm 102 is integrally formed with a substantially octagonal mounting portion 103. The mounting portion 103 is formed with a pair of through holes 104 aligned with a first axis X1 and a pair of through holes 105 aligned with a second axis X2. The first axis X1 and the second axis X2 orthogonally intersect each other at a bending point (origin) O. The first arm 101 is formed with a pair of supporting portions 106 projecting so as to be opposed to each other. The supporting portions 106 of the first arm 101 are rotatably mounted at their front ends to the mounting portion 103 of the second arm 102 by inserting pin members 107 through the through holes 104 of the mounting portion 103, thus supporting the first arm 101 to the second arm 102 so that the first arm 101 is rotatable about the first axis X1. Reference numeral 108 denotes a substantially U-shaped rotor (swinging member) rotatably mounted at its opposite ends to the mounting portion 103 of the second arm 102 by inserting pin members 109 through the through holes 105 of the mounting portion 103, thus supporting the U-shaped rotor 108 to the second arm 102 so that the U-shaped rotor 108 is rotatable about the second axis X2.

Figure 9:
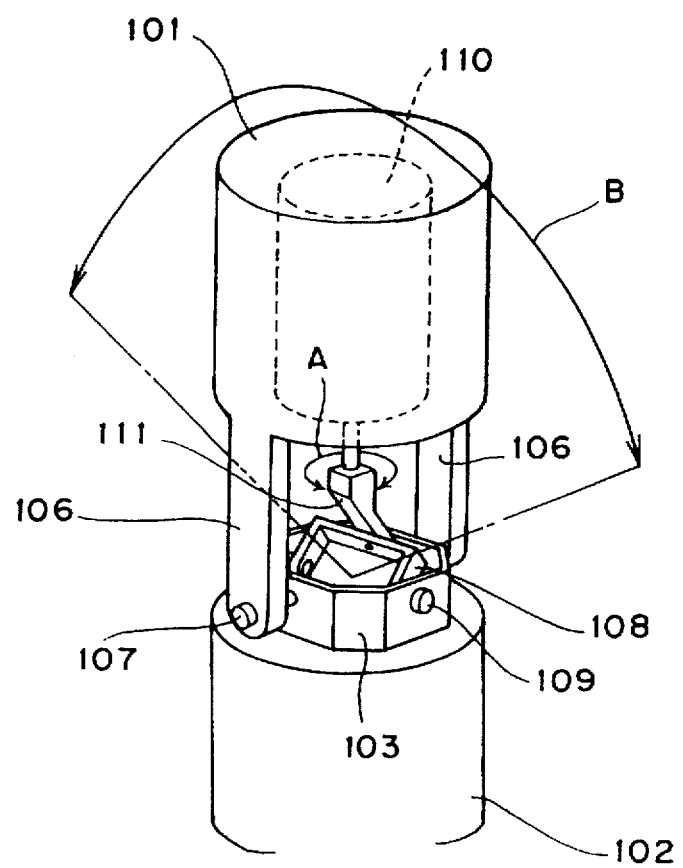
FIG. 9 is a perspective view showing the operation of the third preferred embodiment.

A driving motor 110 is mounted in the first arm 101. The axis of an output shaft of the driving motor 110 coincides with a third axis X3 orthogonally intersecting the first axis X1 at the bending point O. A power transmitting member 111 is integrally mounted on the output shaft of the driving motor 110. The power transmitting member 111 is rotationally driven about the third axis X3 by the driving motor 110. The U-shaped rotor 108 has a first connecting portion at a position (central portion) spaced from the second axis X2. The power transmitting member 111 has a second connecting portion at a position (front end portion) spaced from the third axis X3. The U-shaped rotor 108 and the power transmitting member 111 are connected by a pin member 112 at the first connecting portion and the second connecting portion in such a manner as to be mutually rotatable about a fourth axis X4 orthogonally intersecting the second axis X2 at the bending point O and obliquely intersecting the third axis X3 at a given angle α. The angle α formed between the third axis X3 and the fourth axis X4 is set smaller than π/2. The angle formed between the second axis X2 and the fourth axis X4 determines an angle in an initial state, and it is unnecessary to set this angle to π/2; however, this angle between the axis X2 and the axis X4 is set larger than the angle α. With this arrangement, a continuous rotating motion by the driving motor 110 is converted into a bending (swinging) motion of the first arm 101 relative to the second arm 102 or a bending motion of the second arm 102 relative to the first arm 101 by the operation of the power transmitting member 111 and the U-shaped rotor. For example, assuming that the second arm 102 is fixed, a rotating motion A by the driving motor 110 as shown in FIG. 9 is converted into a bending motion B of the first arm 101 relative to the second arm 102.

According to the third preferred embodiment mentioned above, the joint mechanism configured primarily by the power transmitting member 111 and the U-shaped rotor 108 is adopted to thereby obtain the following advantages. Since the driving motor 110 is accommodated in the arm (the first arm 101 in this preferred embodiment), mechanical interference can be suppressed as compared with the conventional configuration such that the driving motor projects outside of the arm. There is no possibility of twist of wiring such as a power supply line (cord) for the driving motor 110 in association with the bending motion of the arm. Since no gears are necessary in use, the arm can be positioned with high accuracy.

(Fourth Preferred Embodiment)

Figure 10:
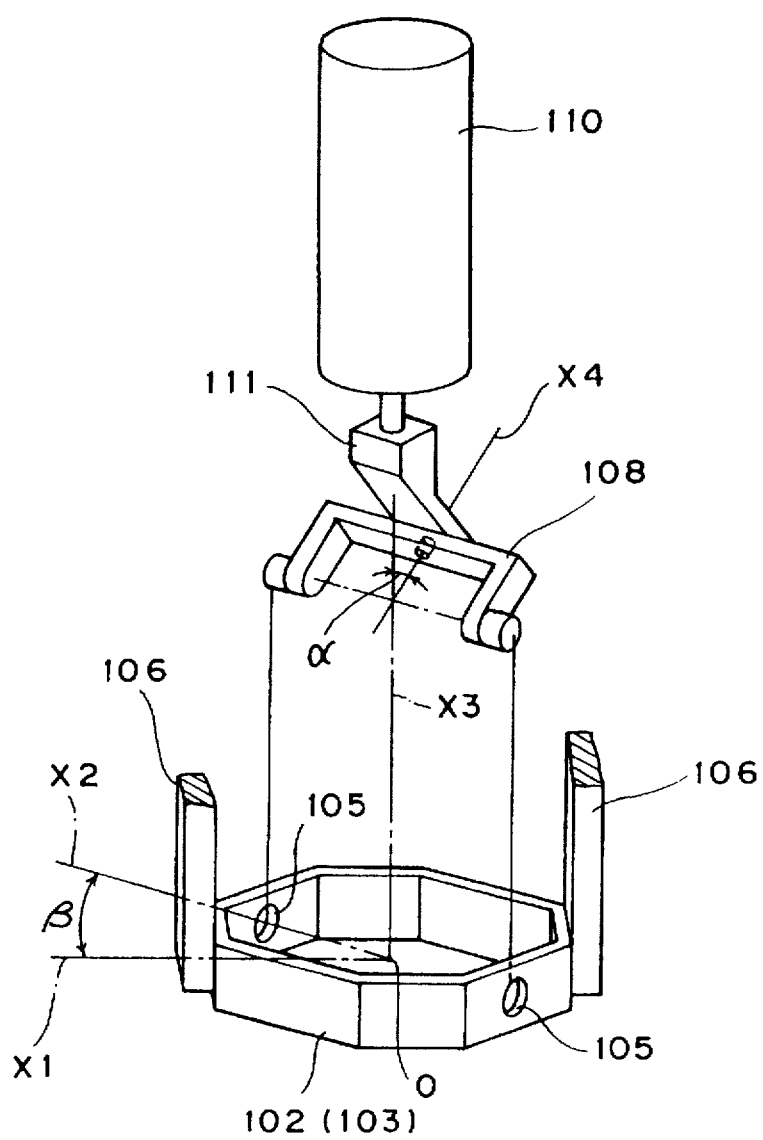
FIG. 10 is an exploded perspective view showing the configuration of a fourth preferred embodiment of the present invention.
Figure 11:
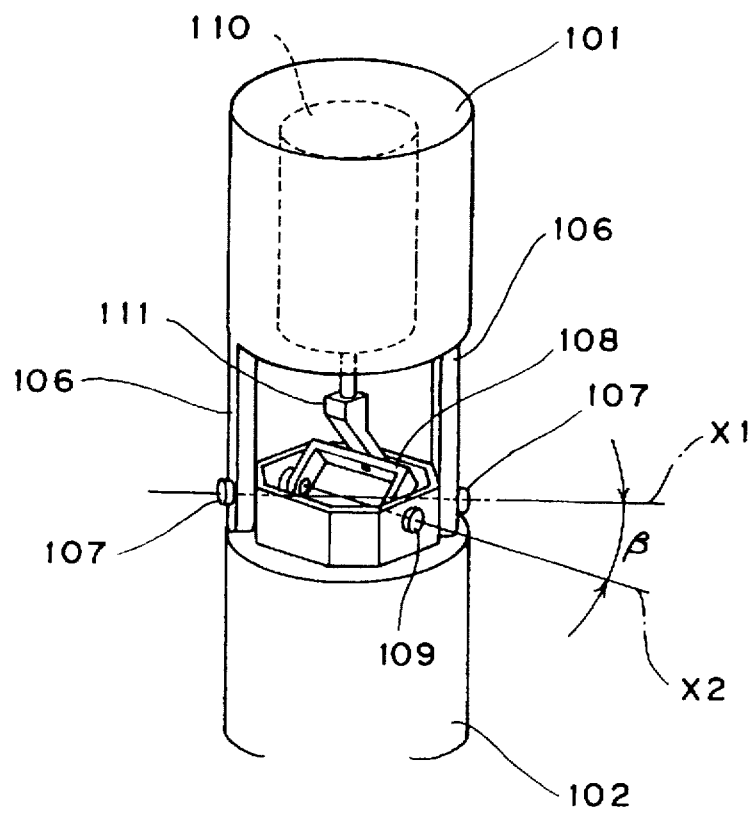
FIG. 11 is a perspective view showing the configuration of the fourth preferred embodiment.

FIG. 10 is an exploded perspective view showing the configuration of an essential part of a fourth preferred embodiment of the present invention, and FIG. 11 is a perspective view of the fourth preferred embodiment in an assembled condition. The fourth preferred embodiment is an improvement of the third preferred embodiment, so that the same parts as those in the third preferred embodiment are denoted by the same reference numerals, and only an improved part will be described. In the third preferred embodiment mentioned above, the first axis X1 as the axis of rotation of the first arm 101 relative to the second arm 102 and the second axis X2 as the axis of rotation of the U-shaped rotor 108 relative to the second arm 102 orthogonally intersect each other at the bending point O, that is, the angle β formed between the first axis X1 and the second axis X2 is set to π/2. To the contrary, in the fourth preferred embodiment, the first axis X1 and the second axis X2 obliquely intersect each other at the bending point O. In this preferred embodiment, the angle β formed between the first axis X1 and the second axis X2 is set to π/4. Alternatively, the angle β formed between the first axis X1 and the second axis X2 may be set to any angle falling in the range of $0<\beta<\pi/2$ other than $\pi/4$.

In the third preferred embodiment mentioned above, the components are prone to interfere with each other in view of the arrangement of the components and the shaft support positions. Accordingly, dimensional limitation of the components such as the U-shaped rotor 108 is large. To avoid the mechanical interference and meet the requirement of reduction in size of the joint mechanism, the wall thickness of the U-shaped rotor 108 or other components must be reduced. That is, the angle $\alpha$ formed between the third axis X3 and the fourth axis X4 must be made as large as possible in the range of $0<\alpha<\pi/2$, so as to enlarge the tiltable range of the arm. However, if the angle $\alpha$ is made large, the fourth axis X4 approaches the first axis X1, so that it is necessary to reduce the wall thickness of the U-shaped rotor 108 or other components. According to the fourth preferred embodiment, the first axis X1 as the axis of rotation of the first arm 101 relative to the second arm 102 and the second axis X2 as the axis of rotation of the U-shaped rotor 108 relative to the second arm 102 obliquely intersect each other at the bending point O. Accordingly, even when the angle $\alpha$ formed between the third axis X3 and the fourth axis X4 is set large, the fourth axis X4 does not so approach the first axis X1, so that the wall thickness of the U-shaped rotor 108 or other components can be set large to thereby improve the strength without an increase in size of the joint mechanism.

Figure 12:
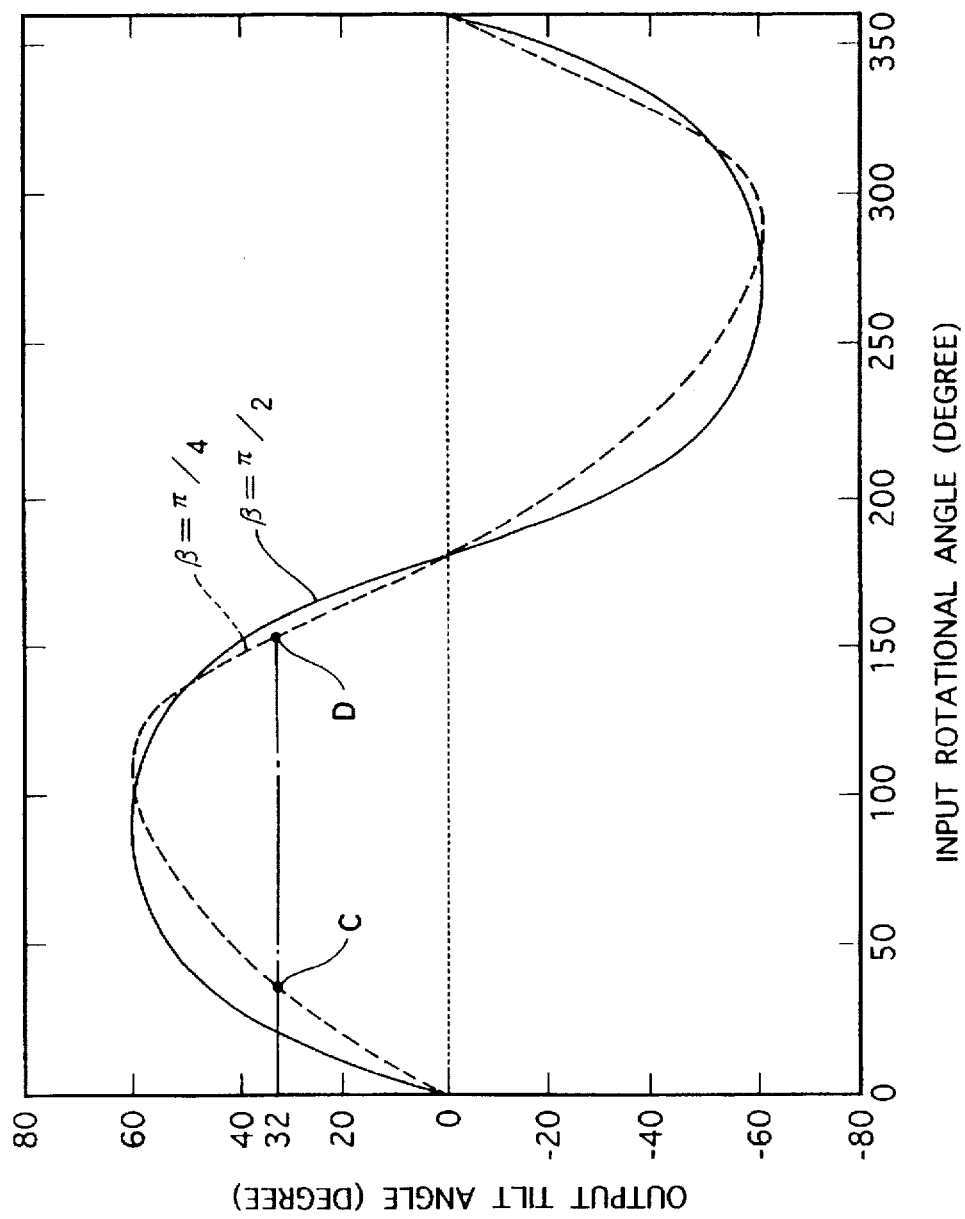
FIG. 12 is a graph showing the relation between input rotational angle and output tilt angle in the fourth preferred embodiment.

FIG. 12 is a graph showing the relation between the rotational angle (input rotational angle) of the power transmitting member by the driving motor and the tilt angle (output tilt angle) of the arm. In FIG. 12, the solid-line curve shows the above relation in the case that the angle $\beta$ formed between the first axis X1 and the second axis X2 is set to $\pi/2$ as in the third preferred embodiment, whereas the broken-line curve shows the above relation in the case that the angle $\beta$ is set to $\pi/4$ as in the fourth preferred embodiment. Assuming that the ratio of the input rotational angle to the output tilt angle is defined as a reduction ratio and that the maximum tilt angle (bending angle) is set to 60 degrees, the minimum value of the reduction ratio in the fourth preferred embodiment ($\beta=\pi/4$) becomes 0.83 and the minimum value of the reduction ratio in the third preferred embodiment ($\beta=\pi/2$) becomes 0.58. Thus, the minimum value of the reduction ratio in the fourth preferred embodiment is larger than that in the third preferred embodiment. Accordingly, by suitably using such a minimum reduction ratio, any effect on the output tilt angle due to error (displacement) of the axis of the output shaft of the driving motor 110 from the third axis X3 and torsional deformation of the output shaft can be reduced to thereby facilitate positioning control.

Further, as apparent from FIG. 12, different reduction ratios can be realized at the same output tilt angle according to different input rotational angles of the output shaft of the driving motor 110. For example, in comparing two points C and D corresponding to an output tilt angle of 32 degrees, the reduction ratio at the point D is smaller than that at the point C. Accordingly, in applying this preferred embodiment to a joint mechanism of a robot, it is possible to select a mode for operating the arm at high speeds and a mode for generating high thrusts at the same position (the same tilt angle) according to the input rotational angle of the output shaft of the driving motor 110. For example, in the case of performing an operation requiring high speeds in an industrial robot, the input rotational angle of the output shaft of the driving motor 110 may be preset in a range corresponding to a smaller reduction ratio (in the vicinity of the point D), whereas in the case of performing an operation requiring high thrusts in the same industrial robot, the input rotational angle of the output shaft of the driving motor 110 may be preset in a range corresponding to a larger reduction ratio (in the vicinity of the point C). With this setting, two kinds of operations of different properties can be performed by using one kind of robot, thereby allowing expansion of a range of operation of the robot.

(Fifth Preferred Embodiment)

Figure 13:
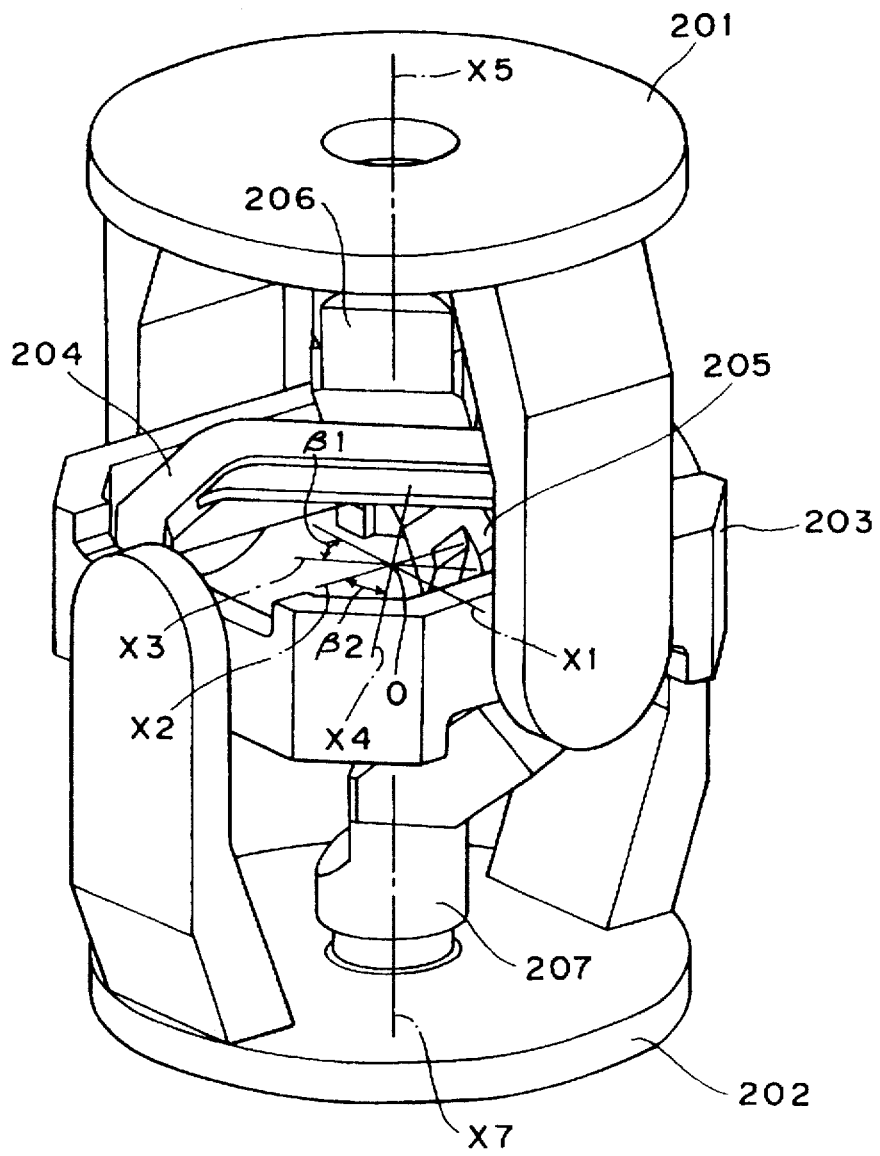
FIG. 13 is a perspective view showing the configuration of a fifth preferred embodiment of the present invention.
Figure 14A:
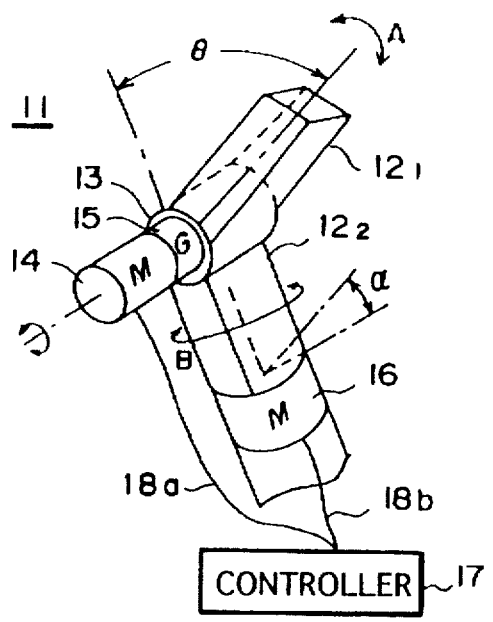
FIG. 14A is a schematic view illustrating a joint mechanism of a robot in the related art.
Figure 14B:
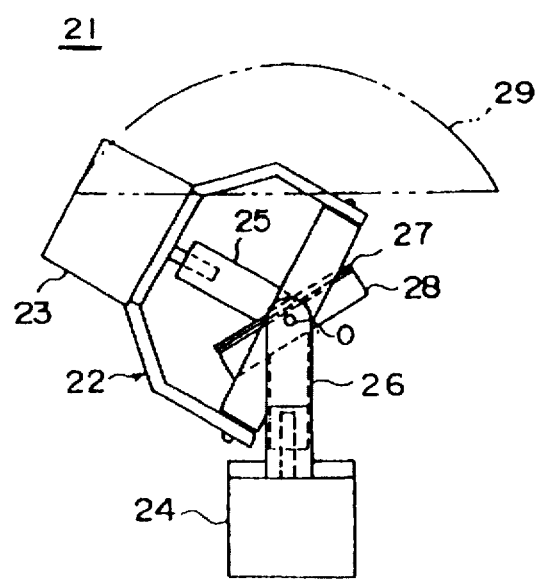
FIG. 14B is a schematic view illustrating another joint mechanism of a robot in the related art.

Having described a robot employing a joint mechanism having one degree of freedom in each of the third and fourth preferred embodiments, the present invention may be applied to a joint mechanism having two degrees of freedom on the basis of a similar principle. A fifth preferred embodiment of the present invention in this respect will now be described with reference to FIG. 13. In FIG. 13, there is shown a joint mechanism having two degrees of freedom for connecting a first arm 201 and a second arm 202 as a part of a robot arm. An arm connecting member 203 is located between the first arm 201 and the second arm 202. The first arm 201 is supported to the arm connecting member 203 so as to be rotatable about a first axis X1, and the second arm 202 is supported to the arm connecting member 203 so as to be rotatable about a second axis X2. The second axis X2 orthogonally intersects the first axis X1 at a bending point O. A first U-shaped rotor 204 is supported to the arm connecting member 203 so as to be rotatable about a third axis X3 intersecting the first axis X1 at the bending point O. The angle $\beta1$ formed between the first axis X1 and the third axis X3 is set to $\pi/4$. Alternatively, the angle $\beta1$ may be set to any angle falling in the range of $0<\beta1<\pi/2$ other than $\pi/4$.

Further, the angle $\beta1$ may be set to $\pi/2$. In this case, the third axis X3 comes to coincidence with the second axis X2. The first U-shaped rotor 204 has a first connecting portion at a position (central portion) spaced from the third axis X3. A second U-shaped rotor 205 is supported to the arm connecting member 203 so as to be rotatable about a fourth axis X4 intersecting the second axis X2 at the bending point O. The angle $\beta2$ formed between the second axis X2 and the fourth axis X4 is set to $\pi/4$. Alternatively, the angle $\beta2$ may be set to any angle falling in the range of $0<\beta2<\pi/2$ other than $\pi/4$. Further, the angle $\beta2$ may be set to $\pi/2$. In this case that the angle $\beta2$ is set to $\pi/2$, the fourth axis X4 comes to coincidence with the first axis X1. The third axis X3 and the fourth axis X4 orthogonally intersect each other at the bending point O. The second U-shaped rotor 205 has a second connecting portion at a position (central portion) spaced from the fourth axis X4.

A first power transmitting member 206 is supported to the first arm 201 so as to be rotatable about a fifth axis X5 orthogonally intersecting the first axis X1 at the bending point O. The first power transmitting member 206 has a third connecting portion at a position (front end portion) spaced from the fifth axis X5. The first power transmitting member 206 is connected at its third connecting portion to the first connecting portion of the first U-shaped rotor 204 so as to be rotatable about a sixth axis orthogonally intersecting the third axis X3 at the bending point O and intersecting the fifth axis X5 at the bending point O at a given angle. A second power transmitting member 207 is supported to the second arm 202 so as to be rotatable about a seventh axis X7 orthogonally intersecting the second axis X2 at the bending point O. The second power transmitting member 207 has a fourth connecting portion at a position (front end portion) spaced from the seventh axis X7. The second power transmitting member 207 is connected at its fourth connecting portion to the second connecting portion of the second U-shaped rotor 205 so as to be rotatable about an eighth axis orthogonally intersecting the fourth axis X4 at the bending point O and intersecting the seventh axis X7 at the bending point O at a given angle. Although not shown, a first driving motor for rotationally driving the first power transmitting member 206 about the fifth axis X5 is mounted on the first arm 201, and a second driving motor for rotationally driving the second power transmitting member 207 about the seventh axis X7 is mounted on the second arm 202.

According to the fifth preferred embodiment mentioned above, the following advantages can be obtained. The first driving motor can be mounted on the first arm 201 so as to be positioned on the fifth axis X5, and the second driving motor can be mounted on the second arm 202 so as to be positioned on the seventh axis X7. Accordingly, unlike the conventional configuration such that the driving motor projects outside of the arm, it is possible to suppress mechanical interference of the robot arm. There is no possibility of twist of wiring such as a power supply line (cord) for each driving motor in association with the bending motion of the arm. Since no gears are necessary in use, the arm can be positioned with high accuracy.

In the case that the first axis X1 and the third axis X3 obliquely intersect each other and that the second axis X2 and the fourth axis X4 obliquely intersect each other, mechanical interference of each component can be suppressed as compared with the case that the first axis X1 and the third axis X3 orthogonally intersect each other and that the second axis X2 and the fourth axis X4 orthogonally intersect each other, thereby allowing improvement in strength without an increase in size of the joint mechanism. Further, in the case that the first axis X1 and the third axis X3 obliquely intersect each other and that the second axis X2 and the fourth axis X4 obliquely intersect each other, a mode for operating the arm at high speeds and a mode for generating high thrusts at the same position (the same tilt angle) can be selected according to the input rotational angle of the first power transmitting member 206 by the first driving motor and/or the input rotational angle of the second power transmitting member 207 by the second driving motor, as compared with the case that the first axis X1 and the third axis X3 orthogonally intersect each other and that the second axis X2 and the fourth axis X4 orthogonally intersect each other, thereby allowing two kinds of operations of different properties by the use of one kind of robot and accordingly allowing expansion of a range of operation of the robot. Although the first axis X1 and the second axis X2 orthogonally intersect each other and the third axis X3 and the fourth axis X4 orthogonally intersect each other in the fifth preferred embodiment, this configuration is not essential, but oblique intersection may be adopted.

The present invention is not limited to the details of the above described preferred embodiments. The scope of the invention is defined by the appended claims and all changes and modifications as fall within the equivalence of the scope of the claims are therefore to be embraced by the invention.

What is claimed is:

1. A joint mechanism comprising:

a first arm member;

a second arm member supported to said first arm member so as to be rotatable about a first axis;

a swinging member supported to said second arm member so as to be rotatable about a second axis intersecting said first axis at a bending point, said swinging member having a first connecting portion at a position spaced from said second axis; and a power transmitting member supported to said first arm member so as to be rotatable about a third axis orthogonally intersecting said first axis at said bending point, said power transmitting member having a second connecting portion at a position spaced from said third axis, said power transmitting member being connected at said second connecting portion to said first connecting portion of said swinging member so as to be rotatable about a fourth axis intersecting said second axis at said bending point and obliquely intersecting said third axis at said bending point.

2. A joint mechanism according to claim 1, further comprising driving means mounted on said first arm member, for rotationally driving said power transmitting member about said third axis.

3. A joint mechanism according to claim 2, wherein said first axis and said second axis orthogonally intersect each other.

4. A joint mechanism according to claim 2, wherein an angle of intersection between said first axis and said second axis is set to $\pi/4$.

5. A robot having a joint mechanism comprising:

a first arm member;

a second arm member supported to said first arm member so as to be rotatable about a first axis;

a swinging member supported to said second arm member so as to be rotatable about a second axis intersecting said first axis at a bending point, said swinging member having a first connecting portion at a position spaced from said second axis;

a power transmitting member supported to said first arm member so as to be rotatable about a third axis orthogonally intersecting said first axis at said bending point, said power transmitting member having a second connecting portion at a position spaced from said third axis, said power transmitting member being connected at said second connecting portion to said first connecting portion of said swinging member so as to be rotatable about a fourth axis intersecting said second axis at said bending point and obliquely intersecting said third axis at said bending point; and driving means mounted on said first arm member, for rotationally driving said power transmitting member about said third axis.

6. A joint mechanism comprising:

a first arm member;

a second arm member;

an arm connecting member supported to said first arm member so as to be rotatable about a first axis and supported to said second arm member so as to be rotatable about a second axis intersecting said first axis at a bending point;

a first swinging member supported to said arm connecting member so as to be rotatable about a third axis intersecting said first axis at said bending point, said first swinging member having a first connecting portion at a position spaced from said third axis;

a second swinging member supported to said arm connecting member so as to be rotatable about a fourth axis intersecting said third axis at said bending point, said second swinging member having a second connecting portion at a position spaced from said fourth axis;

a first power transmitting member supported to said first arm member so as to be rotatable about a fifth axis orthogonally intersecting said first axis at said bending point, said first power transmitting member having a third connecting portion at a position spaced from said fifth axis, said first power transmitting portion being connected at said third connecting portion to said first connecting portion of said first swinging member so as to be rotatable about a sixth axis intersecting said third axis at said bending point and obliquely intersecting said fifth axis at said bending point; and a second power transmitting member supported to said second arm member so as to be rotatable about a seventh axis orthogonally intersecting said second axis at said bending point, said second power transmitting member having a fourth connecting portion at a position spaced from said seventh axis, said second power transmitting member being connected at said fourth connecting portion to said second connecting portion of said second swinging member so as to be rotatable about an eighth axis intersecting said fourth axis at said bending point and obliquely intersecting said seventh axis at said bending point.

7. A joint mechanism according to claim 6, further comprising:

first driving means mounted on said first arm member, for rotationally driving said first power transmitting member about said fifth axis; and second driving means mounted on said second arm member, for rotationally driving said second power transmitting member about said seventh axis.

8. A joint mechanism according to claim 6, wherein said first axis and said third axis orthogonally intersect each other, and said second axis and said fourth axis orthogonally intersect each other.

9. A joint mechanism according to claim 8, wherein said first axis and said fourth axis coincide with each other, and said second axis and said third axis coincide with each other.

10. A joint mechanism according to claim 6, wherein an angle of intersection between said first axis and said third axis is set to π/4, and an angle of intersection between said second axis and said fourth axis is set to π/4.

11. A robot having a joint mechanism comprising:

a first arm member;

a second arm member;

an arm connecting member supported to said first arm member so as to be rotatable about a first axis and supported to said second arm member so as to be rotatable about a second axis intersecting said first axis at a bending point;

a first swinging member supported to said arm connecting member so as to be rotatable about a third axis intersecting said first axis at said bending point, said first swinging member having a first connecting portion at a position spaced from said third axis;

a second swinging member supported to said arm connecting member so as to be rotatable about a fourth axis intersecting said third axis at said bending point, said second swinging member having a second connecting portion at a position spaced from said fourth axis;

a first power transmitting member supported to said first arm member so as to be rotatable about a fifth axis orthogonally intersecting said first axis at said bending point, said first power transmitting member having a third connecting portion at a position spaced from said fifth axis, said first power transmitting portion being connected at said third connecting portion to said first connecting portion of said first swinging member so as to be rotatable about a sixth axis intersecting said third axis at said bending point and obliquely intersecting said fifth axis at said bending point;

a second power transmitting member supported to said second arm member so as to be rotatable about a seventh axis orthogonally intersecting said second axis at said bending point, said second power transmitting member having a fourth connecting portion at a position spaced from said seventh axis, said second power transmitting member being connected at said fourth connecting portion to said second connecting portion of said second swinging member so as to be rotatable about an eighth axis intersecting said fourth axis at said bending point and obliquely intersecting said seventh axis at said bending point;

first driving means mounted on said first arm member, for rotationally driving said first power transmitting member about said fifth axis; and second driving means mounted on said second arm member, for rotationally driving said second power transmitting member about said seventh axis.

12. A joint mechanism located in a space defined by first, second, and third axial systems, comprising:

a first rotary body having a given number of first degrees of freedom of rotation adapted to rotate on said first axial system;

a second rotary body having a given number of second degrees of freedom of rotation connected to said first rotary body at a fixed point and adapted to rotate about said first axial system, said second rotary body having an input transmitting body offset from at least an axis of said second degrees of freedom of rotation and connected to said second degrees of freedom of rotation; and a third rotary body having a third degree of freedom of rotation adapted to rotate on said third axial system, and having a fourth degree of freedom of rotation oriented to said fixed point at a given angle with respect to said third axial system and connected to said third degree of freedom of rotation;

wherein said second rotary body is rotated about said first axial system by receiving an input from said third degree of freedom of rotation of said third rotary body through said fourth degree of freedom of rotation and said input transmitting body.

13. A joint mechanism according to claim 12, wherein when said first rotary body is mounted to a first connecting member and said second rotary body is mounted to a second connecting member, said second rotary body is reciprocatively rotated on one side only with an initial state being set at an angle of connection between said first connecting member and said second connecting member when said second rotary body is tilted at a maximum angle.

* * * * *

UNITED STATES PATENT AND TRADEMARK OFFICE
CERTIFICATE OF CORRECTION

PATENT NO. : 5,765,443
DATED : June 16, 1998
INVENTOR(S) : Murase et al.

It is certified that error appears in the above-identified patent and that said Letters Patent is hereby corrected as shown below:

Cover Page, [76], below inventors' names, delete lines 1-3 and insert --Kawasaki, both of Japan--.

Cover Page, Col. 1, insert Assignee information as follows: --Fujitsu Limited, Kawasaki, Japan--.

Cover Page, [56], under "U.S. PATENT DOCUMENTS", line 2, change "90118X" to --901/28XR--.

Col. 5, line 39, change "$\pi/4 < \alpha \pi/2$" to --$\pi/4 \leq \alpha < \pi/2$--;

line 41, after "$2\alpha$" delete "a".

Signed and Sealed this

Twenty-ninth Day of December, 1998

Attest:

BRUCE LEHMAN

*Attesting Officer*  *Commissioner of Patents and Trademarks*